United States Patent
Chen et al.

(10) Patent No.: US 9,434,652 B2
(45) Date of Patent: Sep. 6, 2016

(54) INFRARED ABSORPTION MATERIAL, METHOD FOR FABRICATING THE SAME, AND THERMAL ISOLATION STRUCTURE EMPLOYING THE SAME

(71) Applicant: INDUSTRIAL TECHNOLOGY RESEARCH INSTITUTE, Hsinchu (TW)

(72) Inventors: Yu-Chun Chen, Zhongli (TW);
Pei-Hsin Yang, Yunlin County (TW);
Chin-Ching Lin, Taichung (TW);
Yi-Chen Chen, Kaohsiung (TW);
Hung-Chou Liao, Taoyuan (TW);
Mei-Ching Chiang, Zhubei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 125 days.

(21) Appl. No.: 14/335,560

(22) Filed: Jul. 18, 2014

(65) Prior Publication Data

US 2015/0030802 A1 Jan. 29, 2015

Related U.S. Application Data

(60) Provisional application No. 61/857,421, filed on Jul. 23, 2013.

(30) Foreign Application Priority Data

Dec. 12, 2013 (TW) .............. 102145805 A
May 8, 2014 (TW) .............. 103116353 A (51) Int. Cl.
C04B 35/495 (2006.01)
G02B 5/20 (2006.01)

(52) U.S. Cl.
CPC ............. *C04B 35/495* (2013.01); *G02B 5/208* (2013.01); *Y10T 428/24* (2015.01); *Y10T 428/2982* (2015.01)

(58) Field of Classification Search
CPC ...... G02B 5/223; C01P 2006/80; B32B 3/28
USPC ............................ 252/587; 423/440; 428/98
See application file for complete search history.

(56) References Cited

U.S. PATENT DOCUMENTS 2,952,575 A 9/1960 Baltzer
4,232,097 A 11/1980 Shanks et al.

(Continued)

FOREIGN PATENT DOCUMENTS

CN 102197076 A 9/2011
CN 102197076 A * 9/2011 ............. B82Y 30/00

(Continued)

OTHER PUBLICATIONS

International Search Report dated Sep. 26, 2014, as issued in corresponding International Patent Application No. PCT/CN2014/082536 (12 pages).

(Continued)

*Primary Examiner* — Brent O'Hern
(74) *Attorney, Agent, or Firm* — Muncy, Geissler, Olds & Lowe, P.C.

(57) ABSTRACT

The disclosure provides an infrared absorption material, a method for fabricating the same, and a thermal isolation structure employing the same. The infrared absorption material includes a tungsten bronze complex having a formula of $M^1_x M^2_y WO_z$, wherein $0.6 \leq x \leq 0.8$, $0.2 \leq y \leq 0.33$, $0.8 \leq x+y < 1$, and $2 \leq z \leq 3$; $M^1$ is Li, or Na; and, $M^2$ is K, Rb, or Cs. In particular, the tungsten bronze complex consists of a cubic tungsten bronze (CTB) and a hexagonal tungsten bronze (HTB).

25 Claims, 7 Drawing Sheets

(56) References Cited

U.S. PATENT DOCUMENTS

| | | | |
|---|---|---|---|
| 8,083,847 B2 | 12/2011 | Takeda et al. | |
| 8,168,711 B2 | 5/2012 | Mamak et al. | |
| 8,202,927 B2 | 6/2012 | Hiwatashi | |
| 8,258,226 B2 | 9/2012 | Fujita | |
| 8,268,202 B2 | 9/2012 | Mamak et al. | |
| 8,268,460 B2 | 9/2012 | Fujita | |
| 8,277,702 B2 | 10/2012 | Chang et al. | |
| 8,304,099 B2 | 11/2012 | Chung et al. | |
| 8,324,300 B2 | 12/2012 | Adochio et al. | |
| 8,470,212 B2 | 6/2013 | Tofuku | |
| 2006/0178254 A1 | 8/2006 | Takeda et al. | |
| 2007/0187653 A1 | 8/2007 | Takeda et al. | |
| 2010/0210772 A1 | 8/2010 | Hiwatashi | |
| 2011/0143116 A1 | 6/2011 | Chung et al. | |
| 2011/0248225 A1 | 10/2011 | Mamak et al. | |
| 2011/0297899 A1 | 12/2011 | Tofuku | |
| 2012/0129090 A1 | 5/2012 | Mamak et al. | |
| 2012/0138842 A1 | 6/2012 | Fu et al. | |
| 2012/0297899 A1 | 11/2012 | Scott et al. | |

FOREIGN PATENT DOCUMENTS

| | | | |
|---|---|---|---|
| CN | 102471090 A | | 5/2012 |
| CN | 102471090 A | * | 5/2012 ............ C01G 41/006 |
| CN | 102719891 A | | 10/2012 |
| SU | 1130789 A1 | | 12/1984 |
| TW | 200530132 | * | 9/2005 |
| TW | 200530132 A | | 9/2005 |
| TW | 201121894 A | | 7/2011 |
| TW | 201224067 A | | 6/2012 |

OTHER PUBLICATIONS

Office Action issued on Apr. 22, 2015 by the Taiwanese Patent Office in corresponding TW Patent Application No. 103116353.

K. Adachi et al., "Activation of plasmons and polarons in solar control cesium tungsten bronze and reduced tungsten oxide nanoparticles," J. Mater. Res., vol. 27, No. 6, Mar. 28, 2012, pp. 965-970.

C. Guo et al., "Discovery of an excellent IR absorbent with a broad working waveband: $Cs_xWO_3$ nanorods," Chem. Commun., 2011, 47, pp. 8853-8855.

C. Guo et al., "Effects of Crystallization Atmospheres on the Near-Infrared Absorption and Electroconductive Properties of Tungsten Bronze Type $M_xWO_3$ (M=Na, K)," J. Am. Ceram. Soc., 95[5], 2012, pp. 1634-1639.

K. Moon et al., "Near Infrared Shielding Properties of Quaternary Tungsten Bronze Nanoparticle $Na_{0.11}Cs_{0.22}WO_3$," Bull. Korean Chem. Soc., vol. 34, No. 3, 2013, pp. 731-733.

C. Guo et al., "Supercritical Solvothermal Synthesis and Near-Infrared Absorbing Properties of $Cs_xWO_3$," Functional Materials Letters, vol. 5, No. 2, 2012, pp. 1260001-1-1260001-4.

* cited by examiner

INFRARED ABSORPTION MATERIAL, METHOD FOR FABRICATING THE SAME, AND THERMAL ISOLATION STRUCTURE EMPLOYING THE SAME

CROSS REFERENCE TO RELATED APPLICATION

This application claims priority of application No. 103116353 filed in Taiwan on May 8, 2014 and application No. 102145805 filed in Taiwan on Dec. 12, 2013 under 35 U.S.C. §119; and this application claims priority of U.S. Provisional Application No. 61/857,421 filed on Jul. 23, 2013 under 35 U.S.C. §119(e), the entire contents of all of which are hereby incorporated by reference.

TECHNICAL FIELD

The technical field relates to an infrared absorption material, a method for fabricating the same, and a thermal isolation structure employing the same.

BACKGROUND

In order to achieve energy savings and carbon reduction, a thermal isolation film is generally formed on the window glass of buildings or vehicles. Due to their thermal isolation characteristics, metal oxides have been widely used in the thermal isolation film.

Accordingly, there is a need to develop a thermal isolation material having a high visible light transmittance and a high infrared radiation absorption efficiency.

SUMMARY

An embodiment of the disclosure provides an infrared absorption material, wherein the infrared absorption material includes a tungsten bronze complex having a formula of $M^1_x M^2_y WO_z$, wherein $0.6 \leq x \leq 0.8$, $0.2 \leq y \leq 0.33$, $0.8 \leq x+y < 1$, and $2 < z \leq 3$, and $M^1$ is Li, or Na; $M^2$ is K, Rb, or Cs. In particular, the tungsten bronze complex consists of a cubic tungsten bronze and a hexagonal tungsten bronze. The infrared absorption material can be applied in a thermal isolation structure to meet the requirements of high transmittance and high thermal isolation.

An embodiment of the disclosure provides a method for fabricating an infrared absorption material, wherein the method includes: providing a tungsten-containing precursor; providing a first alkali metal compound and a second alkali metal compound; mixing the first alkali metal compound, the second alkali metal compound, and the tungsten-containing precursor to form a mixture; and, subjecting the mixture to a thermal treatment, obtaining the aforementioned infrared absorption material. The thermal treatment includes a first heating step and a second heating step.

Embodiments of the disclosure provide a thermal isolation structure, including: a first substrate and a first functional layer formed on the substrate. In particular, the first functional layer includes the aforementioned infrared absorption material.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

An embodiment of the disclosure provides an infrared absorption material including a tungsten bronze complex. In particular, the tungsten bronze complex consists of a cubic tungsten bronze, and a hexagonal tungsten bronze.

According to an embodiment of the disclosure, the disclosure provides an infrared absorption material. The infrared absorption material includes a tungsten bronze complex having a formula of $M^1_x M^2_y WO_z$, wherein $0.6 \leq x \leq 0.8$, $0.2 \leq y \leq 0.33$, $0.8 \leq x+y < 1$, and $2 < z \leq 3$, and $M^1$ is lithium (Li), or sodium (Na); $M^2$ is potassium (K), rubidium (Rb), or cesium (Cs). In particular, the tungsten bronze complex consists of a cubic tungsten bronze and a hexagonal tungsten bronze.

According to an embodiment of the disclosure, when the infrared absorption material includes a tungsten bronze complex having a formula of $M^1_x M^2_y WO_z$ and the molar ratio between the cubic tungsten bronze and the hexagonal tungsten bronze is between 0.995:99.005 and 5.005:94.995, of more than 60% of infrared radiation (with a wavelength between 750-2500 nm), which is emitted into the infrared absorption material, can be absorbed thereby. Further, the infrared absorption material can have an average visible light (with a wavelength between 400-750 nm) transmittance more than 65%.

According to an embodiment of the disclosure, the tungsten bronze complex has a formula of $Na_x K_y WO_z$, wherein $0.6 \leq x \leq 0.8$, $0.2 \leq y \leq 0.33$, $0.8 \leq x+y < 1$, and $2 < z \leq 3$. In addition, according to an embodiment of the disclosure, the tungsten bronze complex has a formula of $Na_x Cs_y WO_z$, wherein $0.6 \leq x \leq 0.8$, $0.2 \leq y \leq 0.33$, $0.8 \leq x+y < 1$, and $2 < z \leq 3$. The tungsten bronze complex can have an average particle size between 20 nm and 200 nm (such as between 20 nm and 150 nm).

Figure 1:
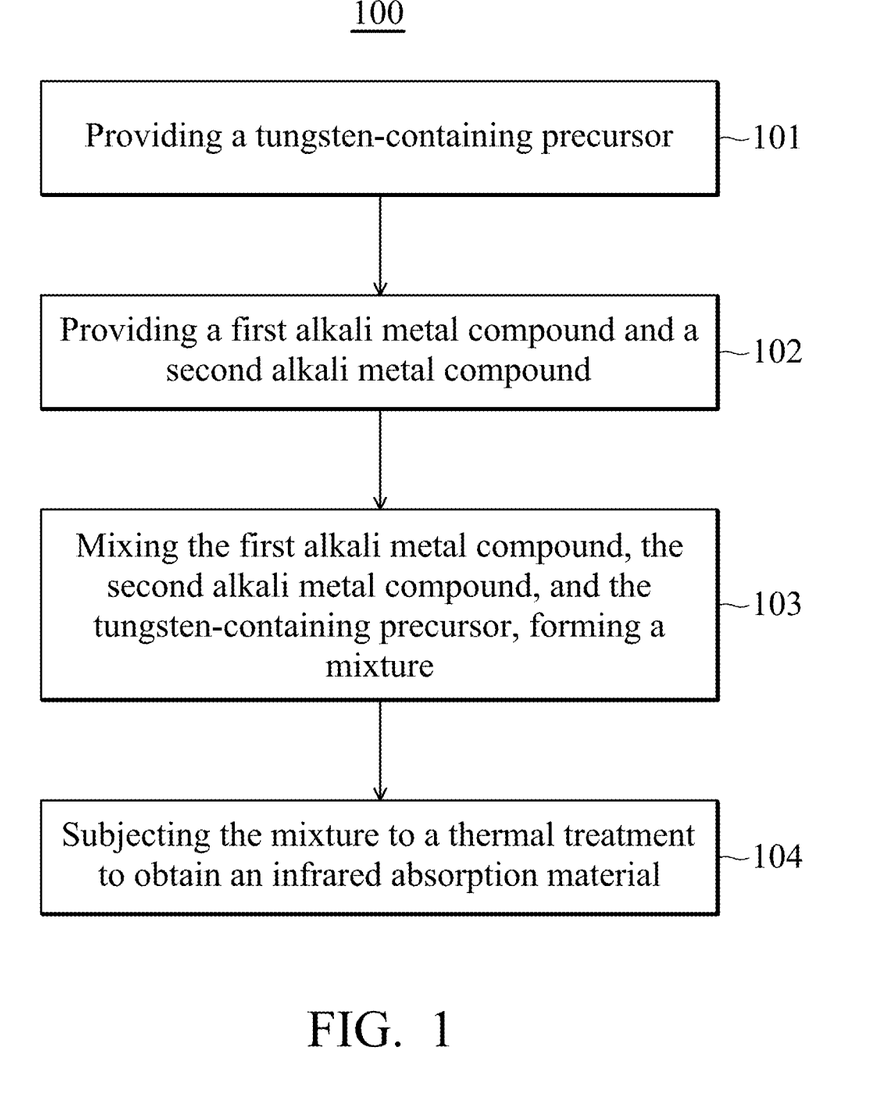
FIG. 1 is a flow chart illustrating a method for fabricating an infrared absorption material according to an embodiment of the disclosure.

According to an embodiment of the disclosure, the disclosure also provides a method for fabricating the aforementioned infrared absorption material. As show in FIG. 1, the method for fabricating the infrared absorption material 100 includes providing a tungsten-containing precursor (steps 101), wherein the tungsten-containing precursor can be ammonium metatungstate, ammonium orthotungstate, ammonium paratungstate, alkali metal tungstate, tungstic acid, tungsten silicide, tungsten sulfide, tungsten oxychloride, tungsten alkoxide, tungsten hexachloride, tungsten tetrachloride, tungsten bromide, tungsten fluoride, tungsten carbide, tungsten oxycarbide, or a combination thereof. Next, a first alkali metal compound and a second alkali metal compound (steps 102) are provided. Next, the tungsten-containing precursor, the first alkali metal compound, and the second alkali metal compound are mixed to obtain a mixture (steps 103). It should be noted that, before mixing the tungsten-containing precursor, the first alkali metal compound, and the second alkali metal compound, the tungsten-containing precursor can be dissolved in water to obtain an aqueous solution having tungsten-containing precursor. In addition, before mixing the tungsten-containing precursor, the first alkali metal compound, and the second alkali metal compound, the first alkali metal compound and the second alkali metal compound can be dissolved in water to obtain an aqueous solution having the first and the second alkali metal compounds. Finally, the mixture is subjected to a thermal treatment, obtaining the infrared absorption material of the disclosure (steps 104). In particular, the first alkali metal compound can be a lithium-containing compound, or sodium-containing compound, such as lithium sulfate, lithium carbonate, lithium chloride, sodium sulfate, sodium carbonate, sodium chloride, or a combination thereof. The second alkali metal compound can be a potassium-containing compound, rubidium-containing compound, or a cesium-containing compound, such as potassium sulfate, potassium carbonate, potassium chloride, potassium sulfate, rubidium carbonate, rubidium chloride, rubidium, cesium sulfate, cesium carbonate, cesium chloride, or a combination thereof.

It should be noted that, in order to obtain the infrared absorption material with the specific ratio between the cubic tungsten bronze and the hexagonal tungsten bronze, the ratio between the weight of the tungsten-containing precursor and the total weight of the first and the second alkali metal compounds is between 2 and 6, and the weight ratio between the first alkali metal compound and the second alkali metal compound is between 0.5 and 2. In addition, the thermal treatment includes a first heating step and a second heating step, and the process temperature of the second heating step is greater than that of the first heating step by at least 20° C. (for example greater than or equal to 30° C.). For example, the first heating step has a process temperature between 90° C. and 150° C. and a processing time between 10 hr and 24 hr; and the second heating step has a process temperature between 151° C. and 200° C. and a process time between 10 hr and 24 hr. It should be noted that, when the process time of the first heating step or the second heating step is less than 10 hr or more than 24 hr, the content of the metal element $M^1$ (such as sodium) and the metal element $M^2$ (such as potassium) of tungsten bronze complex (having a formula of $M^1_xM^2_yWO_z$) would not be within the specific range (i.e. x would be less than 0.6 or more than 0.8, and y would be less than 0.2 or more than 0.33), resulting in that the molar ratio between the cubic tungsten bronze and the hexagonal tungsten bronze not being between 0.995:99.005 and 5.005:94.995. For example, when the metal element $M^1$ is sodium and the process time of the first heating step or the second heating step is less than 10 hr, a result, having sodium, is apt to be tetragonal tungsten bronze, rather than cubic tungsten bronze. On the other hand, when the metal element $M^2$ is potassium and the process time of the first heating step or the second heating step is less than 10 hr, a result, having potassium, is apt to be tetragonal tungsten bronze, rather than hexagonal tungsten bronze. In addition, the heating step can be, for example, a hydrothermal process.

According to an embodiment of the disclosure, the first heating step and second heating step can be hydrothermal treatments. For example, the mixture of the first alkali metal compound, the second alkali metal compound, and the tungsten-containing precursor are dissolved in water to obtain an aqueous solution. Next, the aqueous solution is introduced into the autoclave, and then the autoclave is sealed. Next, the aqueous solution is subjected to the first heating step and the second heating step sequentially, resulting in tungsten bronze crystals being formed via a supersaturated solution derived from the aqueous solution.

Figure 2:
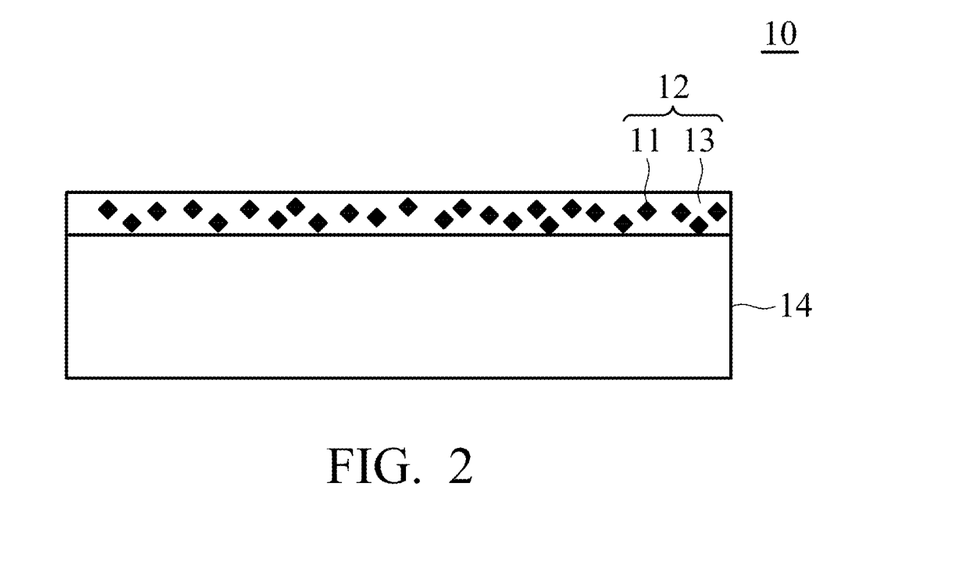
FIG. 2 is a cross-sectional view of a thermal isolation structure according to an embodiment of the disclosure.

According to an embodiment of the disclosure, the disclosure also provides a thermal isolation structure. As shown in FIG. 2, the thermal isolation structure 10 can include a first functional layer 12, wherein the first functional layer 12 can be disposed on a first substrate 14. The first functional layer 12 can include the infrared absorption material 11 of the disclosure. Further, the first functional layer 12 can include a binder 13, and the infrared absorption material 11 is distributed in the binder 13. The method for forming the first functional layer 12 can include the following steps. First, the infrared absorption material 11 and the binder 13 are dissolved into a solvent, obtaining a dispersion. The binder 13 can be an organic binder (such as acrylic resin, epoxy resin, silicone resin, phenoxy resin, urethane resin, urea resin, acrylonitrile-butadiene-styrene resin (ABS resin), polyvinyl butyral resin (PVB resin), polyether resin, fluorine resin, polycarbonate, polystyrene, polyamide, starch, cellulose, a polymer thereof, or a combination thereof), inorganic binder (such as tetraethoxy silane (TEOS), aluminum triisopropoxide, zirconium tetrabutoxide, or titanium tetraisopropoxide), or pressure-sensitive adhesives. The solvent can be water, methanol, ethanol, n-butanol, isopropanol, cyclohexanone, methyl ethyl ketone, tert-butyl methyl ketone, diethyl ether, ethylene glycol dimethyl ether, ethylene glycol ether, ethylene glycol diethyl ether, tetrahydrofuran (THF), propylene glycol methyl ether acetate (PGMEA), ethyl-2-ethoxyethanol acetate, 3-ethoxypropionate, ethyl acetate, isoamyl acetate, chloroform, n-hexyl, heptane, pentane, benzene, toluene, xylene, or cyclohexane. The dispersion can further include a dispersant in order to uniformly distribute the infrared absorption material 11 in the solvent. The dispersant can be a polymeric dispersant, such as polyester, polyamide, poly amino acid ester, polyphosphate, or a combination thereof.

Next, the dispersion is coated on the first substrate 14 to form a coating. The method for coating the dispersion on the first substrate 14 can be spin coating, bar coating, blade coating, roller coating, wire bar coating, or dip coating. The first substrate 14 can include a glass substrate, a transparent plastic substrate, or a combination thereof. Next, the first substrate 14 is dried in an oven with a process temperature between about 25 and 200° C. and a process time between about 0.5 and 60 min, obtaining the first functional layer 12. The first functional layer 12 can have a thickness between about 1 μm and 50 μm, such as between about 4 μm and 6 μm.

Figure 3:
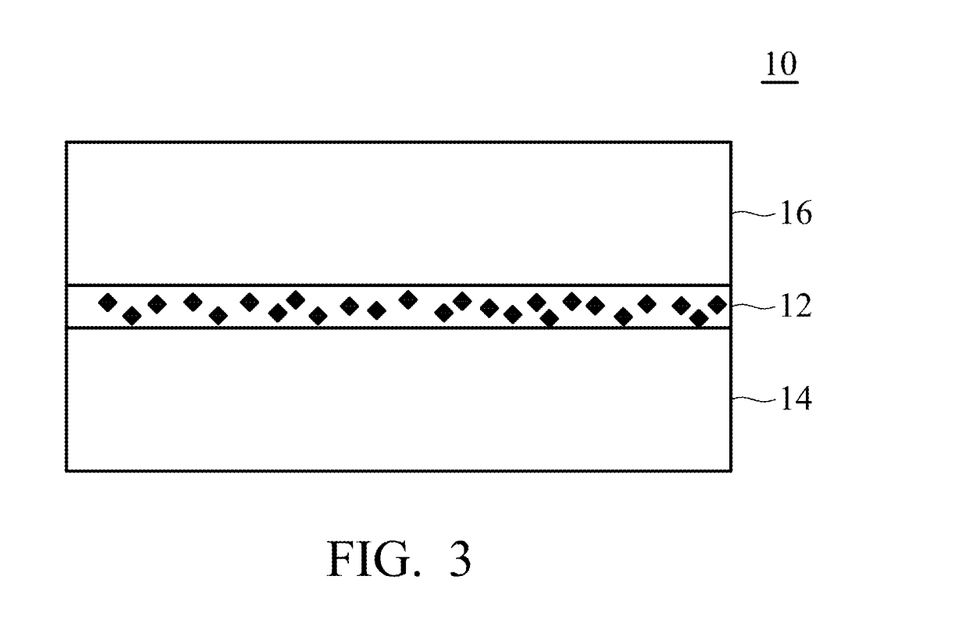
FIG. 3 is a cross-sectional view of a thermal isolation structure according to an embodiment of the disclosure.

According to an embodiment, the thermal isolation structure 10 of the disclosure can further include a second substrate 16 disposed on the first functional layer 12, as show in FIG. 3. Namely, the first functional layer 12 is located between the first substrate 14 and the second substrate 16. In particular, the second substrate 16 and the first substrate 14 can have the same or different thickness and material.

Figure 4:
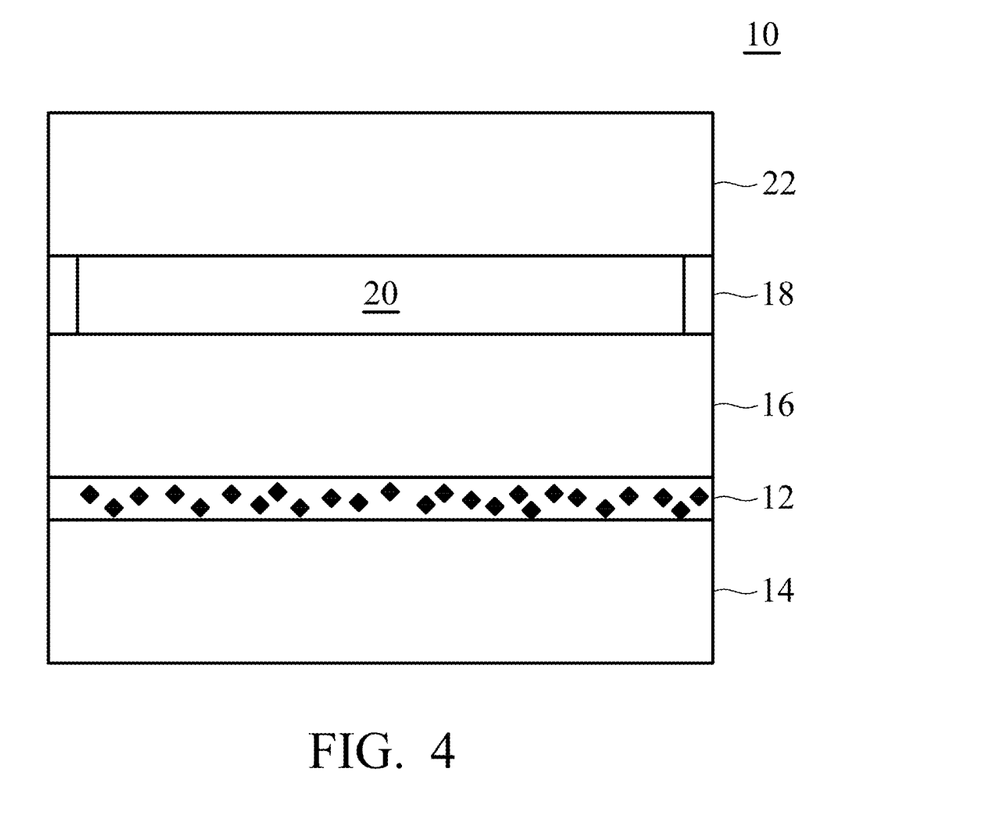
FIG. 4 is a cross-sectional view of a thermal isolation structure according to yet an embodiment of the disclosure.

According to an embodiment, the thermal isolation structure 10 of the disclosure can further include a third substrate 22 disposed on the second substrate 16, As show in FIG. 4. In particular, the second substrate 16 and the third substrate 22 are separated by a chamber 20, and a support spacer 18 surrounds the chamber 20. The chamber 20 can be maintained at a vacuum or filled with air (or another gas such as nitrogen). In particular, the third substrate 22 and the first substrate 14 can have the same or different thickness and material. Suitable materials of the support spacer 18 can be glass, metal, or resin.

According to an embodiment of the disclosure, the thermal isolation structure 10 of the disclosure can further include a second functional layer 24 disposed on the third substrate 22. Further, the thermal isolation structure 10 of the disclosure can further include a fourth substrate 26 disposed on the second functional layer 24, as show in FIG. 5. In particular, the second functional layer 24 and the first functional layer 12 can have the same or different thickness and material; and, the fourth substrate 26 and the first substrate 14 can have the same or different thickness and material.

Below, exemplary embodiments will be described in detail with reference to accompanying drawings so as to be easily realized by a person having ordinary knowledge in the art. The disclosure concept may be embodied in various forms without being limited to the exemplary embodiments set forth herein. Descriptions of well-known parts are omitted for clarity, and like reference numerals refer to like elements throughout.

Preparation of Infrared Absorption Material

Example 1

30 g of ammonium metatungstate (sold and manufactured by SHOWA), 4.388 g of sodium carbonate (sold and manufactured by Alfa Aesar), and 2.488 g of potassium carbonate (sold and manufactured by Alfa Aesar) were dissolved into 95 ml DI water. Next, the obtained solution was introduced into a stainless steel autoclave, and then the autoclave was sealed. The autoclave was heated at 120° C. for 12 hr, and then heated at 180° C. for 12 hr. After reacting, the result was filtered, and the filtrate was washed and then dried at 50° C. via a vacuum oven for 4 hr, obtaining a tungsten bronze complex powder with an average particle size of about 80 nm.

Figure 6:
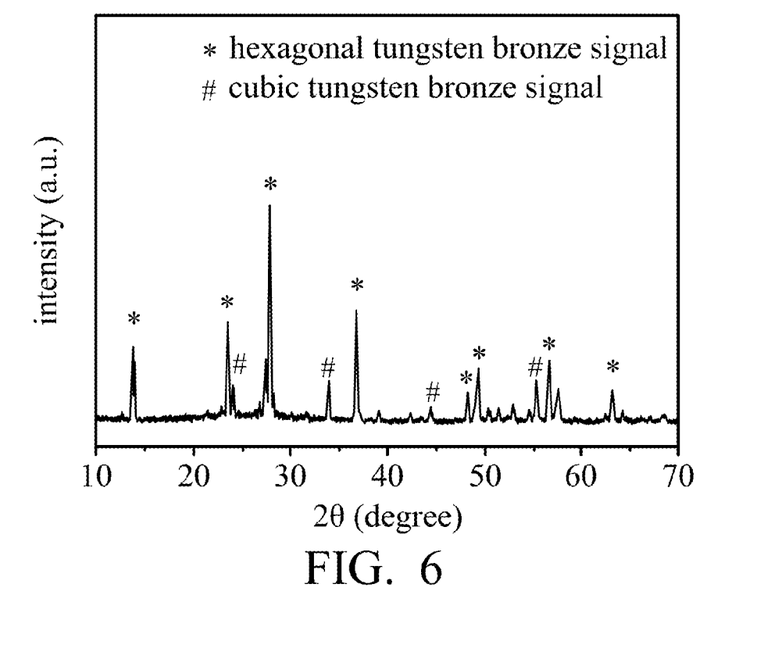
FIG. 6 shows an X-ray diffraction pattern of a tungsten bronze complex of Example 1.

The tungsten bronze complex was characterized using an X-ray photoelectron spectrometer (XPS), and the results show that the molar ratio between Na, K, and W is 0.69:0.3:1 (i.e. the product may have a chemical formula of $Na_{0.69}K_{0.3}WO_3$). Next, the diffraction pattern (FIG. 6) of the tungsten bronze complex was generated using an X-Ray Diffractometer (XRD). As shown in FIG. 6, the tungsten bronze complex of Example 1 consists of a hexagonal tungsten bronze (HTB) and a cubic tungsten bronze (CTB). The molar ratio between the cubic tungsten bronze and the hexagonal tungsten bronze was determined using an inductively coupled plasma-atomic emission spectrometer (ICP-AES), and the result shows that the molar ratio between the cubic tungsten bronze and the hexagonal tungsten bronze is $(1\pm0.005)\%: (99\pm0.005)\%$.

Figure 7:
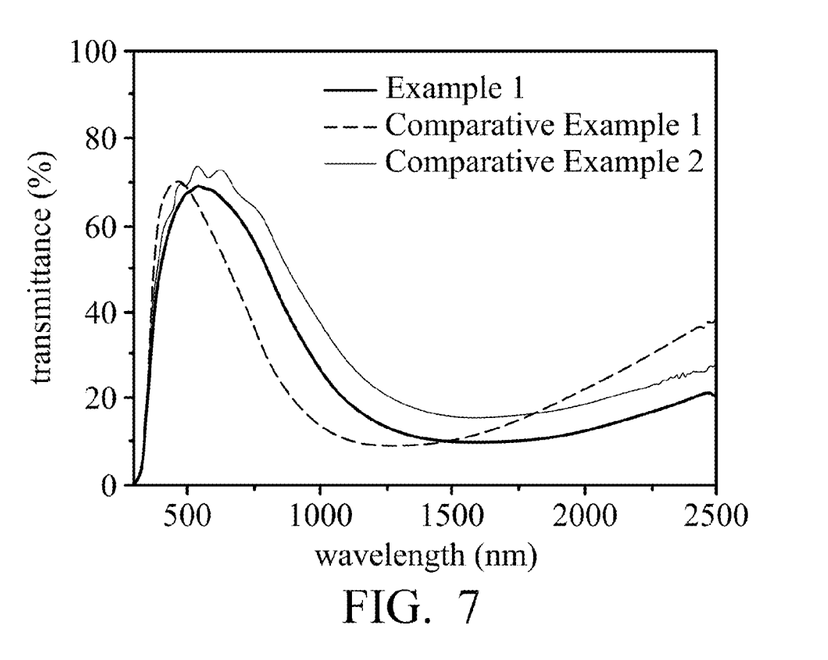
FIG. 7 shows transmission spectra of the tungsten bronze complex of Example 1 and Comparative Examples 1 and 2.

Next, the transmission spectrum (within the wavelength range between 400 nm and 2500 nm) of the tungsten bronze complex was measured, as show in FIG. 7. Furthermore, the absorption spectrum (within the wavelength range between 400 nm and 2500 nm) of the tungsten bronze complex was measured, as show in FIG. 8. Next, the absorption spectrum of Example 1 was integrated and the result is shown in Table 1.

Comparative Example 1

30 g of ammonium metatungstate (sold and manufactured by SHOWA), and 4.388 g of sodium carbonate (sold and manufactured by Alfa Aesar) were dissolved into 71 ml DI water. Next, the obtained solution was introduced into a stainless steel autoclave, and then the autoclave was sealed. The autoclave was heated at 120° C. for 12 hr, and then heated at 180° C. for 12 hr. After reacting, the result was filtered, and the filtrate was washed and then dried at 50° C. via a vacuum oven for 4 hr, obtaining a powder with an average particle size about 80 nm.

The powder was characterized using an X-ray photoelectron spectrometer (XPS), and the results show that the molar ratio between Na, and W is 0.69:1. Next, the powder was characterized using an X-Ray Diffractometer (XRD), the result shows that the product of Comparative Example 1 consists of a cubic tungsten bronze (CTB).

Next, the transmission spectrum (within the wavelength range between 400 nm and 2500 nm) of the powder was measured, as show in FIG. 7. Further, the absorption spectrum (within the wavelength range between 400 nm and 2500 nm) of the powder was measured, as show in FIG. 8. Next, the absorption spectrum of the powder was integrated and the result is shown in Table 1.

Comparative Example 2

30 g of ammonium metatungstate (sold and manufactured by SHOWA), and 2.488 g of potassium carbonate (sold and manufactured by Alfa Aesar) were dissolved into 66.3 ml DI water. Next, the obtained solution was introduced into a stainless steel autoclave, and then the autoclave was sealed. The autoclave was heated at 120° C. for 12 hr, and then heated at 180° C. for 12 hr. After reacting, the result was filtered, and the filtrate was washed and then dried at 50° C. via a vacuum oven for 4 hr, obtaining a powder with an average particle size about 80 nm.

The powder was characterized using an X-ray photoelectron spectrometer (XPS), and the results show that the molar ratio between K, and W is 0.3:1. Next, the powder was characterized using an X-Ray Diffractometer (XRD), the result shows that the product of Comparative Example 2 consists of a hexagonal tungsten bronze (HTB).

Next, the transmission spectrum (within the wavelength range between 400 nm and 2500 nm) of the powder was measured, as show in FIG. 7. Further, the absorption spectrum (within the wavelength range between 400 nm and 2500 nm) of the powder was measured, as show in FIG. 8. Next, the absorption spectrum of the powder was integrated and the result is shown in Table 1.

TABLE 1

|  | chemical formula | crystal system | integration |
| --- | --- | --- | --- |
| Example 1 | $Na_{0.69}K_{0.3}WO_3$ | cubic tungsten bronze and hexagonal tungsten bronze | 142115 |
| Comparative Example 1 | $Na_{0.69}WO_3$ | cubic tungsten bronze | 131975 |
| Comparative Example 2 | $K_{0.3}WO_3$ | hexagonal tungsten bronze | 122770 |

Figure 8:
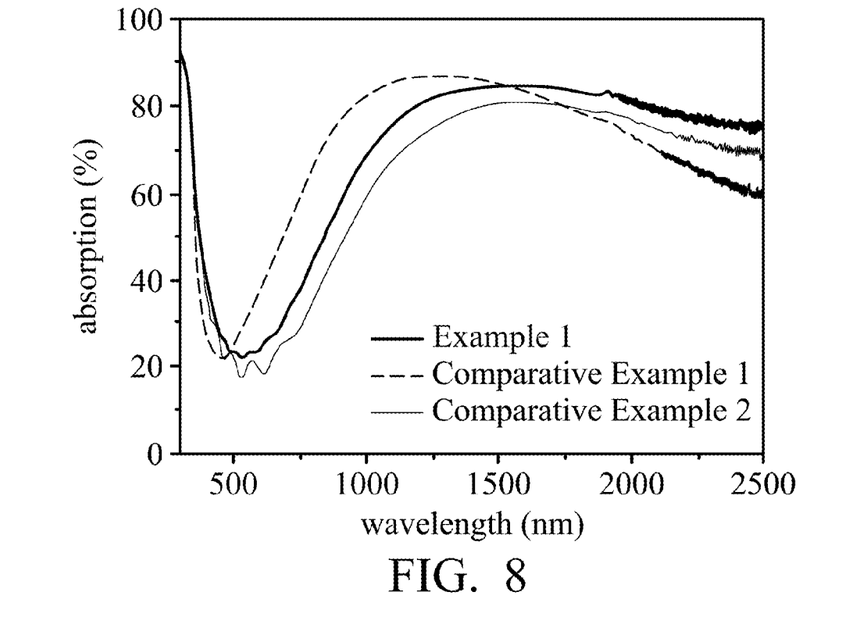
FIG. 8 shows absorption spectra of the tungsten bronze complex of Example 1 and Comparative Examples 1 and 2.

As shown in FIGS. 7-8 and Table 1, the infrared absorption material of the disclosure (Example 1) has an average visible light (with a wavelength between 400-750 nm) transmittance of more than 60%.

In addition, in comparison with the product of Comparative Examples 1 and 2, the infrared absorption material of the disclosure (Example 1) has a higher infrared radiation (with a wavelength between 750-2500 nm) absorption efficiency.

Example 2

30 g of ammonium metatungstate (sold and manufactured by Sigma-Aldrich), 4.388 g of sodium carbonate (sold and manufactured by Alfa Aesar), and 2.488 g of potassium carbonate (sold and manufactured by Alfa Aesar) were dissolved into 95 ml DI water. Next, the obtained solution was introduced into a stainless steel autoclave, and then the autoclave was sealed. The autoclave was heated at 120° C. for 15 hr, and then heated at 180° C. for 12 hr. After reacting, the result was filtered, and the filtrate was washed and then dried at 50° C. via a vacuum oven for 4 hr, obtaining a tungsten bronze complex powder with an average particle size about 80 nm.

The tungsten bronze complex was characterized using an X-ray photoelectron spectrometer (XPS), and the results show that the molar ratio between Na, K, and W is 0.69:0.3:1 (i.e. the product may have a chemical formula of $Na_{0.69}K_{0.3}WO_3$). Next, the diffraction pattern of the tungsten bronze complex was generated using an X-Ray Diffractometer (XRD), and the result shows that the tungsten bronze complex of Example 2 consists of a hexagonal tungsten bronze (HTB) and a cubic tungsten bronze (CTB). The molar ratio between the cubic tungsten bronze and the hexagonal tungsten bronze was determined using an inductively coupled plasma-atomic emission spectrometer (ICP-AES), and the result shows that the molar ratio between the cubic tungsten bronze and the hexagonal tungsten bronze is (1±0.005)%: (99±0.005)%.

Figure 9:
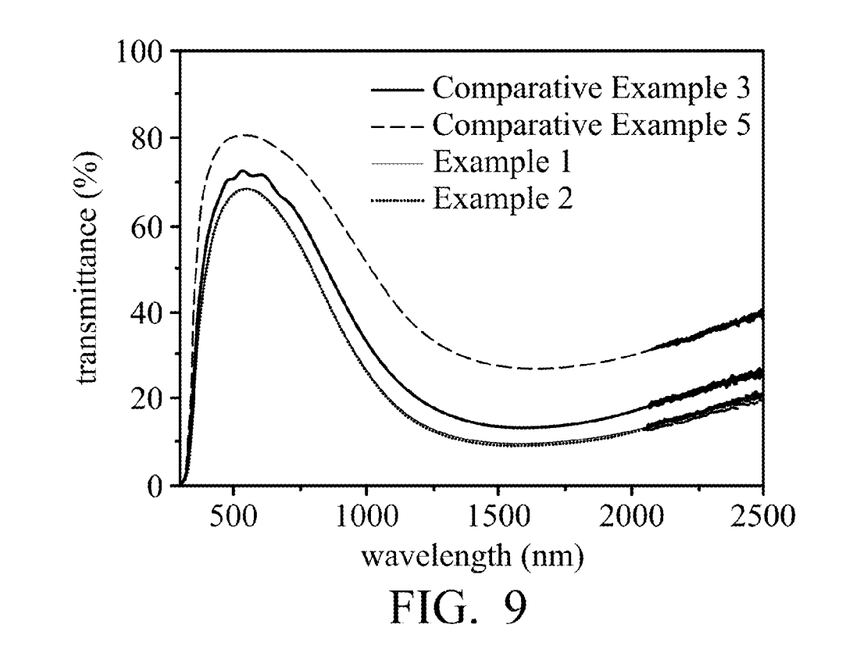
FIG. 9 shows transmission spectra of Examples 1 and 2 and Comparative Examples 3 and 5.

Next, the transmission spectrum (within the wavelength range between 400 nm and 2500 nm) of the tungsten bronze complex was measured, as show in FIG. 9. Further, the absorption spectrum (within the wavelength range between 400 nm and 2500 nm) of the tungsten bronze complex was measured. Next, the absorption spectrum of Example 2 was integrated and the result is shown in Table 2.

Example 3

30 g of ammonium metatungstate (sold and manufactured by Sigma-Aldrich), 4.388 g of sodium carbonate (sold and manufactured by Alfa Aesar), and 5.865 g of caesium carbonate (sold and manufactured by Alfa Aesar) were dissolved into 95 ml DI water. Next, the obtained solution was introduced into a stainless steel autoclave, and then the autoclave was sealed. The autoclave was heated at 120° C. for 12 hr, and then heated at 180° C. for 12 hr. After reacting, the result was filtered, and the filtrate was washed and then dried at 50° C. via a vacuum oven for 4 hr, obtaining a tungsten bronze complex powder with an average particle size about 80 nm.

The tungsten bronze complex was characterized using an X-ray photoelectron spectrometer (XPS), and the results show that the molar ratio between Na, Cs, and W is 0.69:0.3:1 (i.e. the product may have a chemical formula of $Na_{0.69}Cs_{0.3}WO_3$). Next, the diffraction pattern of the tungsten bronze complex was generated using an X-Ray Diffractometer (XRD), and the result shows that the tungsten bronze complex of Example 2 consists of a hexagonal tungsten bronze (HTB) and a cubic tungsten bronze (CTB). The molar ratio between the cubic tungsten bronze and the hexagonal tungsten bronze was determined using an inductively coupled plasma-atomic emission spectrometer (ICP-AES), and the result shows that the molar ratio between the cubic tungsten bronze and the hexagonal tungsten bronze is (1±0.005)%: (99±0.005)%.

Figure 10:
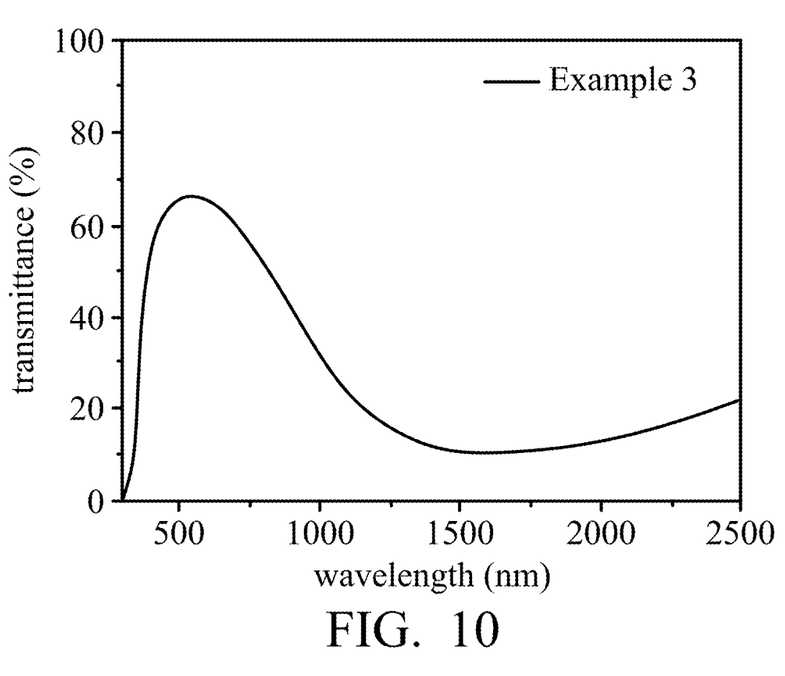
FIG. 10 shows a transmission spectrum of the tungsten bronze complex of Example 3.

Next, the transmission spectrum (within the wavelength range between 400 nm and 2500 nm) of the tungsten bronze complex was measured, as show in FIG. 10. Further, the absorption spectrum (within the wavelength range between 400 nm and 2500 nm) of the tungsten bronze complex was measured, and the absorption spectrum of Example 3 was integrated and the result is shown in Table 2.

Comparative Example 3

30 g of ammonium metatungstate (sold and manufactured by SHOWA), 4.388 g of sodium carbonate (sold and manufactured by Alfa Aesar), and 2.488 g of potassium carbonate (sold and manufactured by Alfa Aesar) were dissolved into 95 ml DI water. Next, the obtained solution was introduced into a stainless steel autoclave, and then the autoclave was sealed. The autoclave was heated at 120° C. for 12 hr, and then heated at 180° C. for 6 hr. After reacting, the result was filtered, and the filtrate was washed and then dried at 50° C. via a vacuum oven for 4 hr, obtaining a powder with an average particle size about 80 nm.

The powder was characterized using an X-ray photoelectron spectrometer (XPS), and the results show that the molar ratio between Na, K, and W is 0.46:0.3:1 (i.e. the product may have a chemical formula of $Na_{0.46}K_{0.3}WO_3$). Next, the diffraction pattern of the tungsten bronze complex of Comparative Example 3 was generated using an X-Ray Diffractometer (XRD), and the result shows that the tungsten bronze complex of Comparative Example 3 consists of a hexagonal tungsten bronze (HTB) and a tetragonal tungsten bronze (TTB).

Next, the transmission spectrum (within the wavelength range between 400 nm and 2500 nm) of the tungsten bronze complex of Comparative Example 3 was measured, as show in FIG. 9. Further, the absorption spectrum (within the wavelength range between 400 nm and 2500 nm) of the tungsten bronze complex of Comparative Example 3 was measured, and the absorption spectrum of Comparative Example 3 was integrated and the result is shown in Table 2.

Comparative Example 4

30 g of ammonium metatungstate (sold and manufactured by Sigma-Aldrich), 4.388 g of sodium carbonate (sold and manufactured by Alfa Aesar), and 2.488 g of potassium carbonate (sold and manufactured by Alfa Aesar) were dissolved into 95 ml DI water. Next, the obtained solution was introduced into a stainless steel autoclave, and then the autoclave was sealed. The autoclave was heated at 150° C. for 6 hr, and then heated at 180° C. for 12 hr. After reacting, the result was filtered, and the filtrate was washed and then dried at 50° C. via a vacuum oven for 4 hr, obtaining a powder with an average particle size about 80 nm.

The powder was characterized using an X-ray photoelectron spectrometer (XPS), and the results show that the molar ratio between Na, K, and W is 0.46:0.3:1 (i.e. the product may have a chemical formula of $Na_{0.46}K_{0.3}WO_3$). Next, the diffraction pattern of the tungsten bronze complex of Comparative Example 4 was generated using an X-Ray Diffractometer (XRD), and the result shows that the tungsten bronze complex of Comparative Example 4 consists of a hexagonal tungsten bronze (HTB) and a tetragonal tungsten bronze (TTB).

Comparative Example 5

30 g of ammonium metatungstate (sold and manufactured by Sigma-Aldrich), 4.388 g of sodium carbonate (sold and manufactured by Alfa Aesar), and 4.147 g of potassium carbonate (sold and manufactured by Alfa Aesar) were dissolved into 99.2 ml DI water. Next, the obtained solution was introduced into a stainless steel autoclave, and then the autoclave was sealed. The autoclave was heated at 120° C. for 6 hr, and then heated at 150° C. for 24 hr. After reacting, the result was filtered, and the filtrate was washed and then dried at 50° C. via a vacuum oven for 4 hr, obtaining a powder with an average particle size about 80 nm.

The powder was characterized using an X-ray photoelectron spectrometer (XPS), and the results show that the molar ratio between Na, K, and W is 0.46:0.5:1 (i.e. the product may have a chemical formula of $Na_{0.46}K_{0.5}WO_3$). Next, the diffraction pattern of the tungsten bronze complex of Comparative Example 5 was generated using an X-Ray Diffractometer (XRD), and the result shows that the tungsten bronze complex of Comparative Example 5 consists of a tetragonal tungsten bronze (TTB).

Next, the transmission spectrum (within the wavelength range between 400 nm and 2500 nm) of the tungsten bronze complex of Comparative Example 5 was measured, as show in FIG. 9. Further, the absorption spectrum (within the wavelength range between 400 nm and 2500 nm) of the tungsten bronze complex of Comparative Example 5 was measured, and the absorption spectrum of Comparative Example 5 was integrated and the result is shown in Table 2.

TABLE 2

| | chemical formula | crystal system | integration |
|---|---|---|---|
| Example 1 | $Na_{0.69}K_{0.3}WO_3$ | cubic tungsten bronze and hexagonal tungsten bronze | 142115 |
| Example 2 | $Na_{0.69}K_{0.3}WO_3$ | cubic tungsten bronze and hexagonal tungsten bronze | 142877 |
| Example 3 | $Na_{0.69}Cs_{0.3}WO_3$ | cubic tungsten bronze and hexagonal tungsten bronze | 138861 |
| Comparative Example 3 | $Na_{0.46}K_{0.3}WO_3$ | tetragonal tungsten bronze and hexagonal tungsten bronze | 133714 |
| Comparative Example 5 | $Na_{0.46}K_{0.5}WO_3$ | tetragonal tungsten bronze | 108873 |

According to Examples 1-3, and Comparative Examples 3-5, since the process time of the first heating step or the second heating step of Comparative Examples 3-5 is less than 10 hr, the content of the sodium (the metal element $M^1$) or potassium (the metal element $M^2$) of tungsten bronze complex (having a formula of $M^1_xM^2_yWO_z$) would not be within the specific range (i.e. x would be less than 0.6 or more than 0.8, and y would be less than 0.2 or more than 0.33), resulting in the tungsten bronze not consisting of a cubic tungsten bronze and a hexagonal tungsten bronze. For example, when the process time of the first heating step or the second heating step is less than 10 hr, the sodium-containing tungsten bronze is apt to be a tetragonal tungsten bronze, rather than a cubic tungsten bronze. On the other hand, when the process time of the first heating step or the second heating step is less than 10 hr, the potassium-containing tungsten bronze is apt to be a tetragonal tungsten bronze, rather than a hexagonal tungsten bronze. In addition, as shown in FIG. 6 and Table 2, when the molar ratio between the cubic tungsten bronze and the hexagonal tungsten bronze of the tungsten bronze complex is within a specific range (such as between 0.995:99.005 and 5.005:94.995), the tungsten bronze complex can have an average visible light (with a wavelength between 400-750 nm) transmittance more than 60%, and a superior infrared radiation (with a wavelength between 750-2500 nm) absorption efficiency.

Thermal Isolation Structure

Example 4

The tungsten bronze complex of Example 1 ($Na_{0.69}K_{0.3}WO_3$, serving as infrared absorption material), a polymeric dispersant (DISPERBYK-2000), and a solvent (propylene glycol mono-methyl ether acetate) were ground and mixed, forming a dispersion. Next, the dispersion and an acrylic resin were mixed and then coated on a blue glass (sold by Taiwanglass with a trade name of TGI Tinted Glass Ocean Blue, having a thickness of 5 mm) to form an infrared absorption film after curing, obtaining a thermal isolation structure (1) (having a structure as shown in FIG. 2).

Example 5

The tungsten bronze complex of Example 3 ($Na_{0.69}Cs_{0.3}WO_3$, serving as infrared absorption material), a polymeric dispersant (DISPERBYK-116), and a solvent (propylene glycol mono-methyl ether acetate) were ground and mixed, forming a dispersion. Next, the dispersion and an polyvinyl butyral resin (sold by Chang Chun Plastics Co., Ltd) were mixed and then coated on a first clear glass (sold by Taiwanglass with a trade name of TGI Clear Float Glass, having a thickness of 5 mm) to form an infrared absorption film after curing. Next, a second clear glass (sold by Taiwanglass with a trade name of TGI Clear Float Glass, having a thickness of 5 mm) was disposed on the infrared absorption film, obtaining a thermal isolation structure (2) (having a structure as shown in FIG. 3).

Example 6

The tungsten bronze complex of Example 3 ($Na_{0.69}Cs_{0.3}WO_3$, serving as infrared absorption material), a polymeric dispersant (DISPERBYK-116), and a solvent (ethyl acetate) were ground and mixed, forming a dispersion. Next, the dispersion and an epoxy resin (sold by Nan Ya Plastics Co., Ltd) were mixed and then coated on a green glass (sold by Taiwanglass with a trade name of TGI Tinted Glass French Green, having a thickness of 5 mm) to form an infrared absorption film after curing. Next, a clear glass (sold by Taiwanglass with a trade name of TGI Clear Float Glass, having a thickness of 5 mm) was disposed on the infrared absorption film, obtaining a thermal isolation structure (3) (having a structure as shown in FIG. 3).

Example 7

The tungsten bronze complex of Example 1 ($Na_{0.69}K_{0.3}WO_3$, serving as infrared absorption material), a polymeric dispersant (Efka PX4300), and a solvent (methyl ethyl ketone) were ground and mixed, forming a dispersion. Next, the dispersion and an acrylic pressure-sensitive adhesive were mixed and then coated on a green glass (sold by Taiwanglass with a trade name of TGI Tinted Glass French Green, having a thickness of 5 mm) to form an infrared absorption film after curing. Next, a first clear glass (sold by Taiwanglass with a trade name of TGI Clear Float Glass, having a thickness of 5 mm) was disposed on the infrared absorption film. Next, a support spacer (foam warm-edge spacer) was disposed on the first clear glass, and then a second clear glass (sold by Taiwanglass with a trade name of TGI Clear Float Glass, having a thickness of 5 mm) was disposed on the support spacer, such that the first clear glass and the second clear glass were separated by the support spacer and a chamber. The chamber was filled with air. Therefore, a thermal isolation structure (4) (having a structure as shown in FIG. 4) was obtained.

Example 8

The tungsten bronze complex of Example 1 ($Na_{0.69}K_{0.3}WO_3$, serving as infrared absorption material), a polymeric dispersant (DISPERBYK-116), and a solvent (ethyl acetate) were ground and mixed, forming a dispersion. Next, the dispersion and an epoxy resin were mixed and then coated on a fluorine-doped tin oxide (FTO) glass (sold by Pilkington with a trade name of Low-E Glass) to form an infrared absorption film after curing. Next, a clear glass (sold by Taiwanglass with a trade name of TGI Clear Float Glass, having a thickness of 5 mm) was disposed on the infrared absorption film. Next, a support spacer (foam warm-edge spacer) was disposed on the first clear glass, and then a green glass (sold by Taiwanglass with a trade name of TGI Tinted Glass French Green, having a thickness of 5 mm) was disposed on the support spacer, such that the clear glass and the green glass were separated by the support spacer and a chamber. The chamber was filled with air. Therefore, a thermal isolation structure (5) (having a structure as shown in FIG. 4) was obtained.

Example 9

The tungsten bronze complex of Example 3 ($Na_{0.69}Cs_{0.3}WO_3$, serving as infrared absorption material), a polymeric dispersant (DISPERBYK-2000), and a solvent (propylene glycol mono-methyl ether acetate) were ground and mixed, forming a dispersion. Next, the dispersion and an acrylic resin were mixed and then coated on a green glass (sold by TAIWANGLASS with a trade name of TGI Tinted Glass French Green, having a thickness of 5 mm) to form an infrared absorption film after curing. Next, a clear glass (sold by Taiwanglass with a trade name of TGI Clear Float Glass, having a thickness of 5 mm) was disposed on the infrared absorption film, obtaining a first element.

Next, the above-mentioned steps were repeated, obtaining a second element.

Figure 5:
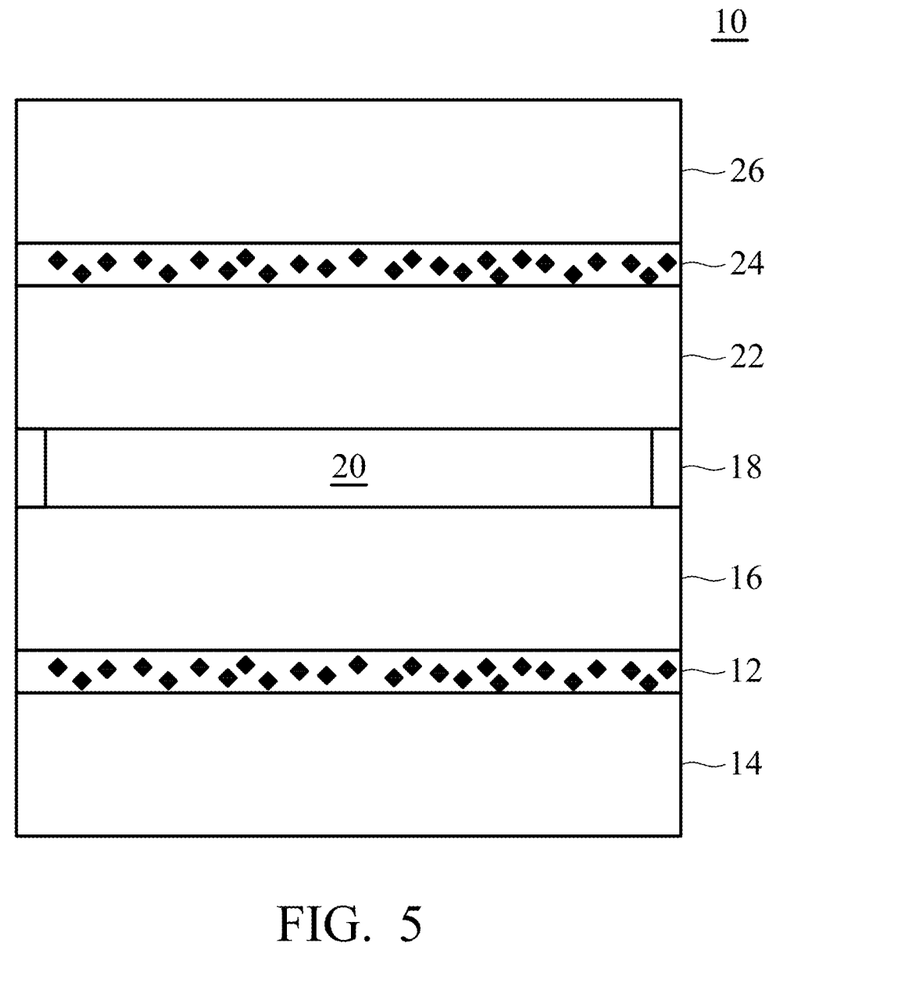
FIG. 5 is a cross-sectional view of a thermal isolation structure according to still an embodiment of the disclosure.

Finally, the second element was disposed on the first element, wherein the first element and the second element were separated by a support spacer (foam warm-edge spacer), forming a chamber between the first element and the second element. Namely, the clear glass of the first element was separated from the green glass of the second element by the support spacer and the chamber. The chamber was filled with air. Therefore, a thermal isolation structure (6) (having a structure as shown in FIG. 5) was obtained.

Example 10

The tungsten bronze complex of Example 3 ($Na_{0.69}Cs_{0.3}WO_3$, serving as infrared absorption material), a polymeric dispersant (DISPERBYK-116), and a solvent (methyl ethyl ketone) were ground and mixed, forming a dispersion. Next, the dispersion and an acrylic resin were mixed and then coated on a green glass (sold by TAIWAN-GLASS with a trade name of TGI Tinted Glass French Green, having a thickness of 5 mm) to form an infrared absorption film after curing. Next, a first clear glass (sold by Taiwanglass with a trade name of TGI Clear Float Glass, having a thickness of 5 mm) was disposed on the infrared absorption film, obtaining a first element.

Next, the tungsten bronze complex of Example 3 ($Na_{0.69}Cs_{0.3}WO_3$, serving as infrared absorption material), a polymeric dispersant (Efka PX4300), and a solvent (ethyl acetate) were ground and mixed, forming a dispersion. Next, the dispersion and an acrylic resin were mixed and then coated on a second clear glass (sold by Taiwanglass with a trade name of TGI Clear Float Glass, having a thickness of 5 mm) to form an infrared absorption film after curing. Next, a third clear glass (sold by Taiwanglass with a trade name of TGI Clear Float Glass, having a thickness of 5 mm) was disposed on the infrared absorption film, obtaining a second element.

Finally, the second element was disposed on the first element, wherein the first element and the second element were separated by a support spacer (aluminum spacer), forming a chamber between the first element and the second element. Namely, the first clear glass of the first element was separated from the second clear glass of the second element by the support spacer and the chamber. The chamber was filled with air. Therefore, a thermal isolation structure (7) (having a structure as shown in FIG. 5) was obtained.

Next, the visible light transmittance and the solar radiation transmittance of the thermal isolation structures (1)-(7) of Examples 4-10 were measured, and the results are shown in Table 3.

TABLE 3

| | visible light transmittance (%) | solar radiation transmittance (%) |
|---|---|---|
| thermal isolation structure (1) | 49.84 | 26.21 |
| thermal isolation structure (2) | 77.33 | 44.42 |
| thermal isolation structure (3) | 67.42 | 31.86 |
| thermal isolation structure (4) | 61.12 | 28.81 |
| thermal isolation structure (5) | 56.25 | 19.56 |
| thermal isolation structure (6) | 45.75 | 10.19 |
| thermal isolation structure (7) | 52.01 | 14.20 |

As shown in Table 3, the tungsten bronze complex of the disclosure can serve as an infrared absorption material and can be further employed by a thermal isolation structure. Therefore, the thermal isolation structure employing the tungsten bronze complex of the disclosure provides daylighting and thermal isolation functions.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. An infrared absorption material, comprising:
a tungsten bronze complex having a formula of $M^1_xM^2_yWO_z$, wherein $0.6 \leq x \leq 0.8$, $0.2 \leq y \leq 0.33$, $0.8 \leq x+y<1$, and $2<z \leq 3$; $M^1$ is Li, or Na; $M^2$ is K, Rb, or Cs; and the tungsten bronze complex consists of a cubic tungsten bronze and a hexagonal tungsten bronze, wherein the molar ratio between the cubic tungsten bronze and the hexagonal tungsten bronze is between 0.995:99.005 and 5.005:94.995.

2. The infrared absorption material as claimed in claim 1, wherein the tungsten bronze complex has a formula of $Na_xK_yWO_z$, wherein $0.6 \leq x \leq 0.8$, $0.2 \leq y \leq 0.33$, $0.8 \leq x+y<1$, and $2<z \leq 3$.

3. The infrared absorption material as claimed in claim 1, wherein the tungsten bronze complex has a formula of $Na_xCs_yWO_z$, wherein $0.6 \leq x \leq 0.8$, $0.2 \leq y \leq 0.33$, $0.8 \leq x+y<1$, and $2<z \leq 3$.

4. The infrared absorption material as claimed in claim 1, wherein the tungsten bronze complex has an average particle size between 20 nm and 200 nm.

5. A method for fabricating infrared absorption material, comprising:
providing a tungsten-containing precursor;
providing a first alkali metal compound and a second alkali metal compound;
mixing the first alkali metal compound, the second alkali metal compound, and the tungsten-containing precursor, forming a mixture; and
subjecting the mixture to a thermal treatment to obtain the infrared absorption material as claimed in claim 1, wherein the thermal treatment comprises a first heating step and a second heating step.

6. The method as claimed in claim 5, wherein the ratio between the weight of the tungsten-containing precursor and the total weight of the first and the second alkali metal compounds is between 2 and 6.

7. The method as claimed in claim 5, wherein the weight ratio between the first alkali metal compound and the second alkali metal compound is between 0.5 and 2.

8. The method as claimed in claim 5, before mixing the tungsten-containing precursor, the first alkali metal compound, and the second alkali metal compound, further comprising:
dissolving the tungsten-containing precursor in water to form a tungsten-containing precursor aqueous solution.

9. The method as claimed in claim 5, before mixing the tungsten-containing precursor, the first alkali metal compound, and the second alkali metal compound, further comprising:
dissolving the first alkali metal compound and the second alkali metal compound in water to form an aqueous solution containing the first alkali metal compound and the second alkali metal compound.

10. The method as claimed in claim 5, wherein the first heating step has a process temperature between 90° C. and 150° C.

11. The method as claimed in claim 5, wherein the first heating step has a process time between 10 hr and 24 hr.

12. The method as claimed in claim 5, wherein the second heating step has a process temperature between 151° C. and 200° C.

13. The method as claimed in claim 5, wherein the second heating step has a process time between 10 hr and 24 hr.

14. The method as claimed in claim 5, wherein a process temperature of the second heating step is greater than that of the first heating step by at least 20° C.

15. The method as claimed in claim 5, wherein the tungsten-containing precursor comprises ammonium metatungstate, ammonium orthotungstate, ammonium paratungstate, alkali metal tungstate, tungstic acid, tungsten silicide, tungsten sulfide, tungsten oxychloride, tungsten alkoxide, tungsten hexachloride, tungsten tetrachloride, tungsten bromide, tungsten fluoride, tungsten carbide, tungsten oxycarbide, or a combination thereof.

16. The method as claimed in claim 5, wherein the first alkali metal compound is a lithium-containing compound, a sodium-containing compound, or a combination thereof.

17. The method as claimed in claim 5, wherein the first alkali metal compound is lithium sulfate, lithium carbonate, lithium chloride, sodium sulfate, sodium carbonate, sodium chloride, or a combination thereof.

18. The method as claimed in claim 5, wherein the second alkali metal compound is a potassium-containing compound, a rubidium-containing compound, a cesium-containing compound, or a combination thereof.

19. A thermal isolation structure, comprising:
a first substrate; and
a first functional layer disposed on the first substrate, wherein the first functional layer comprises an infrared absorption material as claimed in claim 1.

20. The thermal isolation structure as claimed in claim 19, wherein the first substrate is a glass substrate or plastic substrate.

21. The thermal isolation structure as claimed in claim 19, wherein the first functional layer further comprises a binder, and the infrared absorption material is distributed in the binder.

22. The thermal isolation structure as claimed in claim 19, further comprising:
a second substrate disposed on the first functional layer.

23. The thermal isolation structure as claimed in claim 22, further comprising:
a third substrate; and
a support spacer disposed between the second substrate and the third substrate, wherein a chamber is defined between the second substrate, the third substrate, and the support spacer.

24. The thermal isolation structure as claimed in claim 23, further comprising:
a second functional layer disposed on the third substrate; and
a fourth substrate disposed on the second functional layer.

25. The thermal isolation structure as claimed in claim 23, wherein the second functional layer and the first functional layer are made from the same material.

* * * * *